(12) United States Patent
Yoshimura et al.

(10) Patent No.: US 7,371,785 B2
(45) Date of Patent: May 13, 2008

(54) ERASABLE INK COMPOSITION

(75) Inventors: Yasuyuki Yoshimura, Osaka (JP); Norimasa Kurihara, Osaka (JP); Atsushi Sudo, Osaka (JP); Norihiro Hirano, Higashiosaka (JP); Isao Enjon, Kobe (JP)

(73) Assignee: Sakura Color Products Corporation, Osaka-Fu (JP)

( * ) Notice: Subject to any disclaimer, the term of this patent is extended or adjusted under 35 U.S.C. 154(b) by 307 days.

(21) Appl. No.: 10/505,086

(22) PCT Filed: Feb. 14, 2003

(86) PCT No.: PCT/JP03/01609

§ 371 (c)(1),
(2), (4) Date: Aug. 18, 2004

(87) PCT Pub. No.: WO03/068875

PCT Pub. Date: Aug. 21, 2003

(65) Prior Publication Data

US 2005/0143486 A1    Jun. 30, 2005

(30) Foreign Application Priority Data

| Feb. 18, 2002 | (JP) | ............................. | 2002-040241 |
| May 17, 2002 | (JP) | ............................. | 2002-143415 |
| May 22, 2002 | (JP) | ............................. | 2002-147244 |
| Jun. 24, 2002 | (JP) | ............................. | 2002-182740 |
| Dec. 20, 2002 | (JP) | ............................. | 2002-369197 |

(51) Int. Cl.
    *C09D 11/00*     (2006.01)
(52) U.S. Cl. ...................... 523/160; 523/161
(58) Field of Classification Search ................ 523/160, 523/161
    See application file for complete search history.

(56) References Cited

U.S. PATENT DOCUMENTS

| 5,203,913 | A | * | 4/1993 | Yamamoto et al. ......... 524/560 |
| 5,716,217 | A | * | 2/1998 | Imagawa et al. ........... 434/408 |
| 5,814,685 | A | * | 9/1998 | Satake et al. ............... 523/201 |
| 6,099,629 | A | * | 8/2000 | Morita et al. .............. 106/31.6 |
| 6,210,869 | B1 | * | 4/2001 | Ito .............................. 430/619 |
| 6,235,679 | B1 | * | 5/2001 | Mano et al. ................. 503/227 |
| 6,498,203 | B1 | * | 12/2002 | Kito et al. ................... 523/161 |
| 6,533,857 | B1 | | 3/2003 | Schmid et al. |
| 6,663,704 | B2 | * | 12/2003 | Spencer et al. ............ 106/31.9 |
| 6,666,913 | B2 | * | 12/2003 | Hirano et al. .............. 106/31.9 |
| 2004/0010114 | A1 | * | 1/2004 | Ozawa et al. ............... 528/367 |

FOREIGN PATENT DOCUMENTS

| EP | 1 006 162 A1 | 6/2000 |
| JP | 2-80469 | 3/1990 |
| JP | 4-332776 | 11/1992 |
| JP | 5-279614 | 10/1993 |
| JP | 8-504447 | 10/1993 |
| JP | 8-259871 | 10/1996 |
| JP | 9-316357 | 12/1997 |
| JP | 10-195366 | 7/1998 |
| JP | 2000-136339 | 10/1998 |
| JP | 2000-103997 | 4/2000 |
| JP | 2000-103997 A | 4/2000 |
| JP | 2000-136339 A | 5/2000 |
| JP | 2000-191940 A | 7/2000 |
| JP | 2001-19888 | 1/2001 |
| JP | 2001-040261 A | 2/2001 |
| JP | 2001-40261 A | 2/2001 |
| JP | 2001-294797 A | 10/2001 |
| JP | 2003-306631 | 5/2002 |
| JP | 2002-371220 A | 12/2002 |
| JP | 2003-11574 A | 1/2003 |
| JP | 2003-34768 A | 2/2003 |
| JP | 2003-034768 A | 2/2003 |
| JP | 2003-55593 A | 2/2003 |
| WO | 01/16236 A1 | 3/2001 |
| WO | 02/02701 A2 | 1/2002 |
| WO | WO 02-327036 A | * 11/2002 |

OTHER PUBLICATIONS

Machine Translation of 2002-371220 A (2002).*
Machine Translation of 2003-011574 A (2003).*
Machine Translation of 2001-294797 A (2001).*
Machine Translation of 2001-040261 A (2001).*
Machine Translation of 2000-136339 A (2000).*
Machine Translation of JP 08-259871 A (1996).*
Lewis, Sr., Richard J.; Hawley's Condensed Chemical Dictionary 13th Ed., John Wiley & Sons, New York (1997) pp. 907 and 909.*
"Notification of Reasons for Refusal" for JP 2002-147244, issued by Japanese Patent Office Dec. 14, 2006.
Notification of Reasons for Refusal for JP 2002-143415, issued by Japanese Patent Office dated Dec. 14, 2006.

* cited by examiner

*Primary Examiner*—Edward J. Cain
(74) *Attorney, Agent, or Firm*—Hamre, Schumann, Mueller & Larson, P.C.

(57) ABSTRACT

An erasable ink composition comprising water, a water-soluble organic solvent, and the following colorant, colorless resin particles and shear-thinning, viscosity-adjustment agent, characterized in that the colorless resin particles have a mean particle diameter smaller than that of the colorant and are contained in an amount larger than that of the colorant: (a) 3 to wt % (based on the whole ink) of colorless resin particles which are made of at least one resin selected from among acrylic resins, urethane resins, silicone resins and melamine resins and have a mean particle diameter of 0.10 to 10 μm, (b) 1 to 40 wt % (based on the whole ink) of a colorant having a mean particle diameter of 2 μm or above, and (c) 0.01 to 4 wt % (based on the whole ink) of a shear thinning, viscosity-adjustment agent.

34 Claims, 1 Drawing Sheet

FIG.1

ERASABLE INK COMPOSITION

BACKGROUND OF THE INVENTION

Field of the Invention

The present invention relates to an erasable ink composition which can preferably be used for writing instruments such as ball-point pens and marking pens.

Conventionally, an erasable ink composition has been provided in which lines can be erased by an eraser when characters were written on a paper surface. For example, an aqueous erasable ink is known which comprises a resin having a film forming temperature of not greater than 0° C. or a glass transition temperature of not greater than 0° C., a colored resin spherical particle and water, and which has an ink viscosity of 5 to 35 mPa·sec (Japanese Unexamined Publication No Hei 5-279614). Further, an ink composition for paper comprising pigments such as carbon and the like evenly dispersed in aqueous medium in which polyoxyethylene oxide having large molecular weight is dissolved under, as required, the presence of a surfactant, characterized to comprise 1 to 20% by weight of a pigment and 0.01 to 5% by weight of polyoxyethylene oxide, wherein characters or designs drawn on paper can be erased by an eraser is known (Japanese Unexamined Publication No Hei 1-256604).

However, conventional aqueous erasable inks such as these cannot be erased completely since leaving of a color is generated in its line portion (phenomenon in which a colorant is left) and have to be improved in view of erasability. In particular, when writing with high pen pressure, it is impossible to erase until the line cannot be recognized. This problem becomes remarkable when used as an ink for ballpoint pens in which pen pressure tends to be high.

The object of the present invention is to provide an erasable ink composition cap able of easily erasing by an eraser even when writing with high pen pressure.

Further, the object of the present invention is to provide an erasable ink composition capable of easily erasing by an eraser even when writing with high pen pressure as well as showing excellent fixability.

DISCLOSURE OF THE INVENTION

As a result of intensive studies, the present invention has adopted an erasable ink composition comprising at least a colorant and a colorless resin particle.

In this way, by adding a colorless resin particle together with a colorant in an ink composition, compared with an ink not comprising said colorless resin particle, at the time of writing, said colorless resin particle can relatively prevent a colorant from entering into fiber structure such as paper and the like, and at the same time, since a colorless resin particle is colorless and transparent, coloring effect by a colorant can also be reserved. Further, even when a colorant enters into a fiber structure such as paper and the like, compared with an ink not comprising said colorless resin particle, eraser erasability is enhanced.

Therefore, among said ink, in particular, when said colorless resin particle has an average particle diameter which is smaller than that of said colorant, at the time of writing, since said colorless resin particle is more liable to enter into a fiber structure such as paper and the like than said colorant, the penetration of a colorant into a fiber structure such as paper and the like can easily be inhibited and the existence rate of a colorant in a fiber structure such as paper and the like can be reduced and eraser erasability is further enhanced.

In addition, likewise, even when said colorless resin particle has larger specific gravity than that of said colorant, at the time of writing, since said particle is liable to move to a paper surface side in a written mark which accompanies vaporization of a solvent, said colorless resin particle is liable to go into fiber structure such as paper and the like earlier than said colorant, colorant's going into a fiber structure such as paper and the like is easily inhibited and the existence ratio of a colorant in a fiber structure such as paper and the like can be decreased and the eraser erasability can further be enhanced.

Further, likewise, among said ink, in particular, even when colorless resin particle is contained more than a colorant, at the time of writing, since the ratio of said colorless resin particle's going into a fiber structure such as paper and the like increases than said colorant, colorant's going into a fiber structure such ns paper and the like can easily be inhibited and the existence ratio of a colorant in a fiber structure such as paper and the like can be decreased, and therefore, eraser erasability is further improved.

Therefore, as a preferable embodiment of the present invention, among said inks, such inks that combine any one of the following elements have further improved eraser erasability compared with erasable inks which do not comprise colorless resin particles.

(a) said colorless resin particles have an average particle diameter smaller than that of said colorants, (b) said colorless resin particles have larger specific gravity than that of said colorants, and (c) said colorless resin particles have larger content than that of said colorants.

Further, as a preferable embodiment, among said inks, even when said colorless resin particles in particular have larger average particle diameter than that of said colorants, and even when said colorless resin particles have larger specific gravity than that of said colorants, since colorless resin particles with larger specific gravity easily move to paper surface side earlier in a written mark accompanying evaporation of a solvent at a time of writing, and since colorless resin particles have larger average particle diameter than that of colorants, it easily blocks off a fiber structure such as paper and the like, and so, compared with an erasable ink without comprising colorless resin particles, eraser erasability is further enhanced.

In addition, as other embodiments of the present invention, in said erasable ink composition comprising a colorant and a colorless resin particle, such an erasable ink composition that comprises flaky particles as said colorants, in particular, an erasable ink composition comprising colored and/or colorless flaky particles is preferable. In such an ink comprising flaky particles in an ink, in particular, such an ink composition comprising said flaky particles as a colorant, said flaky particles are hard to enter into a fiber structure such as paper and the like even in writing. Therefore, excellent eraser erasability can be shown. In particular, in the case of an ink composition comprising flaky particles of not less than 2 μm, said erasability is excellent. And that, in the case of flaky particles, since the particle shape is flaky, compared with spherical particles, resistance against rubbing is smaller and fixability by adhesive resins on paper and the like is large. The ink composition of this embodiment of the present invention notices the particle shape of flaky particles and in a written mark or a coated film, it can be provided as an erasable ink composition excellent both in eraser erasability and in fixability at the same time.

In addition, as another embodiment of the present invention, in the case of an ink composition comprising a colorant and an adhesive resin, an erasable ink in which an average particle diameter of said colorant is not less than 2 μm, an average particle diameter of said adhesive resin is not less than 2 μm, and the content of its particle diameter of not greater than 2 μm is not less than 30% by weight with respect to the said adhesive resin is preferable. Since such an erasable ink composition comprises said adhesive resin whose particle diameter is smaller compared with said colorant with large particle diameter and said colorant, while said colorant is hard to go into fibers such as paper and the like, an adhesive resin whose small particle diameter is liable to go into fibers of paper and that, said colorant whose particle diameter is large can be fixed from the back by said adhesive resin fixing both from inside and outside of fibers such as paper and the like, and further, since an adhesive resin with large particle diameter is fixed by said adhesive resin whose particle diameter is small from inside of a fiber of paper and the like, even lines written with high pen pressure can easily be erased and at the same time, fixability remarkably improves since written marks can be fixed on paper and the like more firmly.

Further, as another embodiment of the present invention, when colored resin particles colored by dyes, an erasable ink composition comprising melamine resin/silica compound spherical resin sphere colored by dyes having anionic property and in which an average particle diameter of said resin sphere is 2 to 10 μm, and the content of particle diameter of not greater than 2 μm is not greater than 30% by weight in said resin sphere is preferable. When a colored resin particle colored by dyes is used as a colorant, unreacted dyes bleed at a time of writing and as a result that dyes penetrate in paper, a problem of bad erasability occurs, however, in the case of an erasable ink composition comprising melamine resin/silica compound spherical resin sphere colored by dyes having anionic property and in which an average particle diameter of said resin sphere is 2 to 10 μm, and the content of particle diameter of not greater than 2 μm is not greater than 30% by weight in said resin sphere, it can easily be erased without deteriorating erasability.

An erasable ink composition of the present invention can be applied to any inks, both aqueous and oily, in any embodiments mentioned above and mentioned later.

DESCRIPTION OF THE PREFERRED EMBODIMENT (Colorless Resin Particle)

Colorless resin particles of the present invention can be used as long as they refer to colorless and transparent or substantially transparent pigment particles and those with good dispersibility. As colorless resin particles, for example, acrylic resins, styrene resins, urethane resins, silicone resins, melamine resins, and the like can be exemplified. Resins used as colorless resin particles may either be cross linking or uncross linking and regarding particle shapes, irregular shaped resin particles can be used such as spherical shaped, hollow shaped, flat shaped, doughnut shaped, fiber typed, plate typed, and the like. Among them, spherical shaped resin particles, that is, colorless resin spheres are preferable and for example, colorless transparent resin spheres of acrylic resins, styrene resins, urethane resins, silicone resins, melamine resins, and the like are preferable. Said resin spheres may either be perfect spheres or imperfect spheres. Among them, acrylic resin spheres are preferable. For information, colorless resin particles can be used either alone or in combinations of two of them regardless of materials or shapes and the like.

It is preferable that a minimum film forming temperature (MFT) of colorless resin particles of the present invention is not less than 40° C. or that a glass-transition temperature is not less than 40° C. When a minimum film forming temperature (MFT) of colorless resin particles is less than 40° C. or when a glass-transition temperature is less than 40° C., since colorless resin particles show adhesiveness at a room temperature, erasability of a written mark or a coated film is excellent.

Colorless resin particles preferably have an average particle diameter of 0.1 to 10 μm, and more preferably, 0.15 to 5 μm. When an average particle diameter is less than 0.1 μm, it is not preferable since in order to show preventive effect of penetration into a fiber structure, great amount of colorless resin particles has to be added in an ink due to particle's fineness, which causes fluidity of an ink to lower (or example, gelation is liable to occur). On the other hand, when an average particle diameter exceeds 10 μm, colorless resin particles are hard to enter into a fiber of paper, so, erasability by an eraser lowers.

For information, an average particle diameter refers to a weight average particle diameter. This was calculated by finding weight accumulative distribution by an optical transmitting method of a liquid phase settling method (measuring device: "CAPA-700" manufactured by Horiba Ltd), letting a particle diameter with distribution of 50% by weight an average particle diameter. Settling was made by centrifugal separation and specific gravity of colorless resin particles was calculated using absolute specific gravity.

It is preferable that the content of colorless resin particles of the present invention is 1 to 30% by weight with respect to the total amount of the ink composition. When the content is less than 1% by weight, erasability lowers. On the other hand, when the content exceeds 30% by weight, the viscosity becomes too high as an ink, fluidity lowers and it is not preferable. Although the optimum content of colorless resin particles varies depending on kinds, it is 5 to 20% by weight with respect to the total amount of the ink composition.

(Colorant)

As a colorant used in the present invention, it is preferable that a colorant can color a written mark or a coated film and that it has good dispersibility. For example, colored pigments are preferable and inorganic pigments such as carbon black and titanium oxide and the like, organic pigments such as copper phthalocyanine pigments, threne pigments, azo pigments, quinacridon pigments, anthraquinone pigments, dioxazine pigments, indigo pigments, thioindigo pigments, perinone pigments, perylene pigments, indolenone pigments and azomethine pigments and the like, and as for others, glittering pigments such as glass flake pigments, aluminum powder pigments, and pearlescent pigments and the like, and fluorescent pigments and the like can be exemplified. Further, dispersion thereof can be used. In addition, colored emulsion can be used. Colored resin spheres (synthetic resin particle pigments) having various shapes such as spherical shapes, flat shapes, hollow shapes can also be used. For example, resin particles (acrylic resin, styrene resin, urethane resin, and the like) such as resin spheres and the like in which a dye or a pigment is included, or resin particles such as resin spheres and the like colored by a dye can be exemplified. Further, in the present invention, toner for copying and the like can also be used. Among them, colored resin spheres can preferably be used. For information, colorants of the present invention can be used alone or in combinations of two or more of them.

Although the average particle diameter of said colorants used in the present invention is not limited, it is preferable to be not less than 2 μm. It is more preferable to be 2 to 10 μm. In addition, colorants whose average particle diameter is 2 to 7 μm, and a particle diameter of not greater than 1.8 μm is controlled to be in particle size distribution of not greater than 1.6% by weight in said colorants and a particle diameter not less than 7 μm is controlled to be in particle size distribution of not greater than 0.5% by weight in said colorants are preferable since erasability by colorants themselves are added. For information, definition of an average particle diameter and control of particle size distribution is the same as in said colorless resin particles.

In the present invention, it is preferable that the content of colorants is 1 to 40% by weight with respect to the total amount of an ink composition. When the content of colorants is less than 1% by weight with respect to the total amount of an ink composition, a written mark or a coated film is hard to be recognized by visual observation. On the other hand, when the content of colorants exceeds 40% by weight with respect to the total amount of an ink composition, viscosity becomes too much for an ink and fluidity lowers. In addition, glittering feeling lowers, too. The optimum content of colorants is, although it quite differs depending on kinds of colorants, 3 to 20% by weight. Therefore, the preferable content range of colorless resin particles and colorants for enhancing coloring effect of colorants, writing performance (ink fluidity), and eraser erasability is 3 to 30% by weight for colorless resin particles and 1 to 40% by weight for colorants and constitution in which the content of colorless resin particles is greater than that of colorants is preferable.

Further, in the present invention, flaky particles can be used. These flaky particles can either be, as mentioned above, colored (colored particles) or non-colored (non-colored particles: flaky particles to which coloring is not applied). In addition, in the present invention, both colored particles and non-colored particles can be used in combinations. In the present invention, flaky particles can be used as colorants.

Although an average particle diameter of flaky particles is not specifically limited, usually, it is about 0.6 to 10 μm, preferably, 1 to 10 μm, more preferably, not less than 2 μm, and further more preferably, 2 to 10 μm. It is particularly preferable that an average particle diameter of said flaky particles is in the range of 2 to 10 μm, and its particle diameter of not greater than 1.8 μm is contained in 1.6% by weight in said flaky particles.

As flaky particles, they are not specifically limited and known or commercially available flaky (or scaly) pigments can also be used. For example, flaky aluminum particles, flaky alumina particles, flaky boron nitrides can be exemplified. In the present invention, in particular, at least one species of flaky alumina particles and flaky boron nitrides can preferably be used.

Flaky alumina particles themselves are publicly known and commercially available products can be used. As commercially available products, for example, trade names "Serath YFA 02025", "Serath YFA 10030", and "Serath YFA 05025" (all of these are manufactured by YKK Corporation) and trade names "Terases BMM", "Terases BMF", "Terases BMN", "Terases BMP", "Terases BMI", "Terases BMM-B", "Terases BMF-B", "Terases BMN-B", "Terases BMP-B", and "Terases BMI-B" (manufactured by Kawai lime Co., Ltd.) and the like can preferably be used.

In addition, flaky boron nitride particles themselves are publicly known and commercially available products can also be used. As commercially available products, "SHO BN UHP-1", "SHO BN UHP-S1" (manufactured by Showa Denko Co., Ltd.), "Denka boron nitride SP-2", "Denka boron nitride HGP", "Denka boron nitride GP", and "Denka boron nitride SGP" (all of these are manufactured by Denki Kagaku Kogyo KK) and the like can preferably be used.

As flaky particles which were colored (colored flaky particles), for example, colored flaky particles laked by adsorbing dyes with flaky particles, colored flaky particles synthesized with coloring matters on a particle surface after coupling and absorbing dyes with flaky particles and making a lake, colored flaky particles obtained by injecting flaky particles in an aqueous ink of a pigment, followed by filtering and drying, and colored flaky particles with pigment particles fixed by adding a fixing agent of acrylic resin to an ink of the present invention, and in particular, to an aqueous ink are included. Further, a colored flaky particle is included, obtained by mixing similar particles and inorganic oxide into compound oxide based pigment and regulating pH as required, followed by sintering and grinding. As coloring methods, for example, methods disclosed in Japanese Unexamined Patent Publication No.Hei2-80469 and Japanese Unexamined Patent Publication No.Hei9-316357 can be exemplified.

The content amount of a colored and/or non-colored particle may be set properly depending on kinds and the like of particles to be used, but normally, it is about 0.5 to 50% by weight, and preferably, it is 3 to 20% by weight in the composition of the present invention. For information, when said flaky particle is used, it is desirable that said colorless resin particle is contained in 1 to 30% by weight with respect to the total amount of the ink composition.

For information, in the present invention, it is preferable that a colored and/or non-colored flaky particle is used as a colorant. By using a colored and/or non-colored flaky particle as a colorant, more excellent erasability can be shown compared with conventional erasable inks. In addition, it is also excellent in stability (storage ability) and a clogging at a pen (pen tip) can effectively be inhibited or prevented. Therefore, it is preferable in that the erasable ink of the present invention comprising no colorant other than said flaky particle can show excellent erasability.

However, it is no problem when an erasable ink composition of the present invention comprises a colorant other than said flaky particle. For information, in such a case, it is important that said flaky particle is included as a colorant and that the average particle diameter of a colorant including said flaky particle is not less than 2 μm.

In addition, as mentioned already, in the present invention, a colored resin particle colored by a dye can be used. Among them, a colored resin particle colored by a dye can particularly be used as a fluorescent pigment. A preferable resin particle among such colored resin particles is a melamine resin/silica compound spherical resin spheres colored by a dye with anionic property. Since conventional fluorescent pigment having an average particle diameter of not less than 1 μm is prepared by dying a resin surface with a fluorescent dye, followed by grinding for making fine particles, an unreacted dye bleeds and therefore erasability lowers, however, a colored resin particle which can be used in the present invention does not bleed since a dye and a resin make polymerization reaction. In addition, since an average particle diameter of said colored resin particle is 2 to 10 μm, and since the content of said resin whose particle diameter is not greater than 2 μm is not greater than 30% by weight with respect to said resin sphere, no problem of remaining color occurs by erasing with an eraser. For information, from the viewpoint of remaining color by erasing, it is further preferable that a colored resin particle whose particle diameter is not greater than 2 μm is contained in not greater than 10% by weight with respect to said resin sphere. It is further preferable that an erasable ink composition comprises melamine resin/silica compound resin sphere colored by a dye having anionic property and that an average particle diameter of said resin particle sphere is 2 to 10 μm, and the content of said resin whose particle diameter is not greater than 2 μm is not greater than 30% by weight with respect, to said adhesive resin. Such an erasable ink composition can be erased further easily without lowering erasability.

(Shear Thinning Viscosity Imparting Agent)

In the present invention, shear thinning viscosity imparting agents capable of controlling ink viscosity and for preventing colorless resin particles and colorants from settling and realizing dispersal stability can be included.

Shear thinning viscosity imparting agents are not specifically limited as long as they have property of lowering viscosity of an ink composition and showing fluidity (pseudo-plasticity fluidity or thixotropic property) when shear force is applied to an ink composition and can be decided properly depending particularly on kinds of solvents.

When an ink of the present invention is an aqueous medium (water-borne medium), at least one species of polysaccharides and derivatives thereof can preferably be used. As polysaccharides and derivatives thereof, for example, microbial polysaccharides and derivatives thereof such as pullulan, xanthan gum, welan gum, rhamsan gum, succinoglucan and dextran and the like; water-soluble polysaccharides derived from plants and derivatives thereof such as tragacanth gum, guar gum, tara gum, locust bean gum, ghatti gum, arabinogalactan gum, gum arabic, quince seed gum, pectin, starch, psyllium seed gum, pectin, carrageenan, alginic acid, and agar and the like; water-soluble polysaccharides derived from animals and derivatives thereof such as gelatin, casein and albumin can be exemplified. Moreover, acrylic synthetic resins such as polyacrylic acid, styrene-acryl copolymer, and carboxyvinyl polymer and the like can be used. Each of these can be used alone or in combinations with two or more of them. Further, these can be used in the form of commercially available products. Among these shear thinning viscosity imparting agents, microbial polysaccharides and derivatives thereof are preferable.

Further, when an ink of the present invention is an oily medium (non-water-borne medium), at least one species of non pigment type gelation agents can preferably be used. As non pigment type gelation agents, metal soaps such as aluminum soaps and the like, sorbitol derivatives such as dibenzylidene sorbitols and the like, alkyl glutamic acid amides, aliphatic acid amides, polyethylene oxide waxes, dextrin aliphatic acid esters, hydrogenated castor oils, 12-hydroxy stearic acids, polyether ester type surfactant gelation agents and the like can be exemplified. Each of these can be used alone or in combinations of two or more of them. These can also be used in the form of commercially available products. Among these shear thinning viscosity imparting agents, metal soaps are preferable.

The content amount of a shear thinning viscosity imparting agents is about 0.01 to 40% by weight with respect to the composition of the present invention and can be set properly within said range depending on the kinds of shear thinning viscosity imparting agents and solvents and the like to be used. In particular, when at least one species of polysaccharides and the derivatives thereof is used, the content is preferably 0.01 to 5% by weight, and more preferably, 0.03 to 3% by weight. In addition, in particular, when at least one species of non pigment type gelation agent is used, the content is preferably 0.01 to 20% by weight, and more preferably, 0.2 to 10% by weight.

(Viscosity)

The viscosity of an ink composition of the present invention may be properly set depending on the use application and the like of final products, but usually, it is about 100 to 10000 mPa·s and preferably 500 to 5000 mPa·s. For information, the viscosity of an ink can properly be adjusted depending on composition of each component and the like. The ink viscosity of the present invention is represented by the value measured by an ELD viscometer under the condition of 3° (R14) cone at a rotation speed of 0.5 rpm (20° C.).

(Fixing Resin)

In the present invention, fixing resins can be used in order to fix a written mark or a coated film on a paper surface and the like. As preferable fixing resins, water soluble or water dispersible resins which can adjust viscosity can be exemplified and can be used regardless of whether they are natural or synthetic. For example, cellulose derivatives such as gum Arabic, dextrin derivatives, methyl cellulose, hydroxyethyl cellulose, hydroxypropyl cellulose, and carboxy methyl cellulose and the like, vinyl resins such as polyvinyl alcohol, polyvinyl pyrrolidone, and polyvinyl ether and the like, acrylic resins such as polyacrylic acid, carboxy vinyl polymer, and styrene-acryl copolymer and the like, alkyd resins, amino resins, amino alkyd resins, polyester resins, epoxylic resins, silicone resins, and fluoride resins and the like can be used. In addition, diene rubber such as styrene butadiene rubber and acrylonitryl butadiene rubber and the like, non diene rubber such as urethane rubber and silicone lubber can also be used. These can be used as emulsions or dispersions. For information, fixing resins can be used alone or in combinations of two or more of them.

It is preferable that the content of fixing resins is 0.01 to 40% by weight in solids with respect to the total amount of the ink composition. When the content of the fixing resin is less than 0.01% by weight in solids with respect to the total amount of the ink composition, fixability of a written mark or a coated film on a paper surface lowers. In addition, dispersibility of colorless resin spheres and colorants lowers. On the other hand, when the content of the fixing resin exceeds 40% by weight in solids with respect to the total amount of the ink composition, the viscosity becomes too high as an ink, and fluidity lowers. Although the optimum content of fixing resins somewhat varies depending on kinds, it is 0.05 to 20% by weight with respect to the total amount of the ink composition.

For information, as said fixing resins, it is preferable to use adhesive resins. In this case, as adhesive resins, it is preferable that adhesive resins whose particle diameter is not greater than 2 μm (preferably 0.05 to 2 μm) are contained in not less than 30% by weight with respect to the adhesive resins and preferably contained in 30 to 50% by weight.

Figure 1:
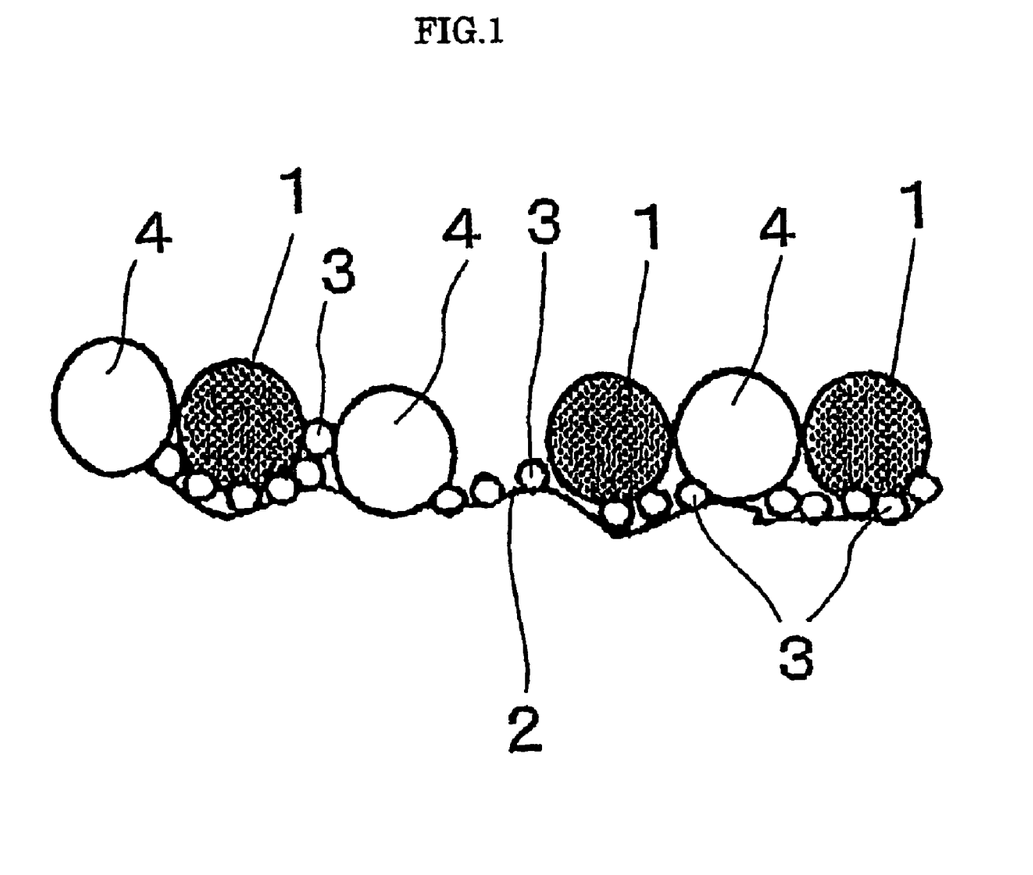
FIG. 1 is a model diagram showing a schematic sectional view of a written mark (coated film) written on paper.

Among them, in particular, adhesive resins whose average particle diameter is not less than 2 µm and not greater than 10 µm, that is, 2 to 10 µm (further preferably, 2 to 8 µm) are preferable. Thus, for example, by making adhesive resins which have a small particle diameter easily entering into a fiber such as paper, adhesive resins which have a large particle diameter hard to enter into a fiber such as paper and the like, colorants which are also hard to enter into a fiber exist altogether, as shown in FIGURE 1, fixing of a written mark on paper and the like more firmly can be possible maintaining good erasability at the same time by fixing said colorant particle 1 with large particle diameter with adhesive resin particle 3 with small particle diameter inside of fiber 2 such as paper and the like while inhibiting said colorant particle 1 from going into fiber 2 of paper, and at the same time, outside of fiber 2, as well as fixing even adhesive resin particle 4 with large particle diameter and further, fixing adhesive resin particle 4 with a large particle diameter from inside of fiber 2 of paper and the like by said adhesive resin particle 3.

In addition, said adhesive resins desirably have a minimum film forming temperature (MFT) of not greater than 40° C. or glass-transition temperature (Tg) of not greater than 40° C.

As adhesive resins, to be specific, adhesive resin particles such as acrylic resin, epoxy resin, urethane resin, silicone resin, polyethylene oxide resin and the like are preferably used and in particular, they are respectively used as synthetic resin emulsion thereof. These adhesive resins can be used alone or in combinations with two or more of them. That is, as said adhesive resins, at least one species of acrylic synthetic resin emulsion, acryl-styrene synthetic resin emulsion, epoxy synthetic resin emulsion, urethane synthetic resin emulsion, silicone synthetic resin emulsion, acrylic synthetic resin, acryl-styrene synthetic resin, urethane synthetic resin, vinyl synthetic resin, cellulose synthetic resin, polyethylene oxide resin is preferably used.

The content amount of adhesive resins may properly be set in relation to other components, and usually it is about 1 to 30% by weight, and preferably 2 to 10% by weight with respect to the total amount of the ink composition. When the content exceeds 30% by weight, viscosity becomes too high and fluidity of an ink deteriorates and erasability lowers. When the content is less than 1% by weight, excellent fixability of a written mark gets hard to be realized. In particular, in the case of an ink in which an average particle diameter of said colorants is not less than 2 µm, preferably 2 to 15 µm, further preferably, 4 to 6 µm, in which an average particle diameter of said adhesive resins is not less than 2 µm, preferably 2 to 10 µm, further preferably, 2 to 8 µm, and in which particle diameters of not greater than 2 µm (preferably, 0.05 to 2 µm) is contained in not less than 30% by weight, preferably 30 to 50% by weight in adhesive resins, by making the content 1 to 30% by weight, preferably 2 to 10% by weight with respect to the total amount of the ink composition, it is optimum in that excellent erasability and fixability to a written mark can be achieved at the same time.

With regard to controlling particle size distribution of the present invention, known classification method such as natural settling, centrifugal separation, filtering and the like can be applied.

This was calculated by finding weight accumulative distribution by an optical transmitting method of a liquid phase settling method (measuring device: "CAPA-700" manufactured by Horiba Ltd), letting a particle diameter with distribution of 50% by weight an average particle diameter. Settling was made by centrifugal separation and specific gravity of colorant particle was calculated using absolute specific gravity.

(Solvent)

When the present invention is applied to an ink, a solvent can be used. In this case, a solvent is not specifically limited, and both water borne and non-water borne types can be used. As a solvent, other than water, alcohols such as ethyl alcohol, isopropyl alcohol, and benzyl alcohol and the like; aromatic hydrocarbons such as toluene and xylene and the like; aliphatic hydrocarbons such as methyl cyclo hexane and the like; ketones such as methyl ethyl ketone, methyl isobutyl ketone, and isophorone and the like; esters such as ethyl acetate and butyl acetate; organic solvents of ether alcohols such as cellosolve, butyl cellosolve, and propylene glycol can be exemplified. In the case of water borne type, water alone or combinations of water and organic solvents (water soluble organic solvents) can be employed. In the case of non water borne type, at least one species of organic solvents may be employed. When said essential components and additives mentioned later are used, the content of solvents may be the residual excluding the content of additives.

For information, when the present invention is applied to an aqueous ink, as mentioned already, water soluble organic solvents can be used. As water soluble organic solvents, it is preferable to use the ones capable of preventing the pen tip from drying and of preventing the ink from freezing. For example, glycols such as ethylene glycol, diethylene glycol, triethylene glycol, propylene glycol, and polyethylene glycol and the like, polyvalent alcohol such as glycerine and the like, glycol ethers such as ethylene glycol monomethyl ether, diethylene glycol monomethyl ether, dipropylene glycol momomethyl ether, and dipropylene glycol monopropyl ether and the like can be exemplified. These organic solvents can be used alone or in combinations with two or more of them.

In the present invention, the content of water soluble organic solvents is preferably 1 to 40% by weight with respect to the total amount of the ink composition. When the content of water soluble organic solvents is less than 1% by weight with respect to the total amount of the ink composition, a pen tip is liable to dry, and an ink is liable to freeze. When the content of water soluble organic solvents exceeds 40% by weight with respect to the total amount of the ink composition, solubility of said water soluble resin (water soluble shear thinning viscosity imparting agent) is affected and a written mark or a coated film is liable to dry. Although the optimum content of water soluble organic solvents somewhat varies depending on kinds, it is about 5 to 20% by weight.

In addition, in the case of an aqueous ink, the content of water may be decided depending on desirable viscosity, kinds of other components, and the added content and the like, and usually it is about 60 to 95% by weight in total, and preferably, 70 to 80% by weight.

(Others)

For information, in the ink composition of the present invention, as required, each kind of additives used in known inks such as each kind of surfactants, wetting agents, antiseptics, fungicides, rust inhibitors, viscosity control agents, pH adjusting agents and the like can further be compounded properly. For example, lubricants such as polyoxyethylene alkali metal salts, dicarboxylic amides, phosphates, N-oleyl sarcosine salts and the like, rust-inhibitors such as benzotriazole and tolyltriazole dicyclohexyl ammonium nitrate and the like, antiseptic mildew-proofing agents such as benzoisothiazoline-type, pentachlorophenol-type and the like and cresol and the like can be added.

In the ink composition of the present invention, each of all the components mentioned above can be used in combinations and the contents mentioned above can properly be combined. However, in an ink composition of the present invention suitable for writing instruments, for example, en erasable ink composition comprising the following components and with colorless resin particles mentioned later whose average particle diameter is smaller than that of colorants mentioned later can be used by storing it in an ink containment portion of a writing instrument:

(a) a colorant whose average particle diameter is not less than 2 μm (preferably, 2 to 10 μm), (b) a colorless rosin particle whose average particle diameter is 0.1 to 10 μm, (c) a shear thinning viscosity imparting agent, and (d) a solvent.

Or, an erasable ink composition comprises the following components.

(a) a colored and/or colorless flaky particle whose average particle diameter is 2 to 10 μm (not including colorants other than said flaky particles), (b) a colorless resin particle whose average particle diameter is 0.1 to 10 μm, (c) a shear thinning viscosity imparting agent, and (d) a solvent.

Or, it is an aqueous erasable ink composition characterized to comprise water, a water-soluble organic solvent, a colorant, a colorless resin particle and a shear thinning viscosity imparting agent as follows, in which said colorless resin particle has a smaller average particle diameter than that of said colorant and the content of said colorless resin particle is more than that of said colorant.

(a) 3 to 30% by weight of a colorless resin particle with respect to the total amount of the ink and said resin is selected at least one from acrylic resin, urethane resin, silicone resin, and melamine and whose average particle diameter is 0.10 to 10 μm, (b) 1 to 40% by weight of a colorant with respect to the total amount of the ink and said colorant has an average particle diameter of not less than 2 μm, preferably, 2 to 10 μm, (c) 0.01 to 4% by weight of shear thinning viscosity imparting agent with respect to the total amount of the ink. In particular, regarding (a) to (c), the following composition is preferable.

(a) 3 to 30% by weight of a colorless resin particle (colorless resin sphere) with respect to the total amount of the ink and said resin is selected at least one from acrylic resin, urethane resin, silicone resin, and melamine and whose average particle diameter is 0.10 to 10 μm, (b) 1 to 40% by weight of a colorant selected at least one from a pigment and a coloring resin particle with respect to the total amount of the ink and said colorant has an average particle diameter of not less than 2 μm, preferably, 2 to 10 μm, (c) 0.01 to 4% by weight of shear thinning viscosity imparting agent selected at least one from xanthane gum, carboxylmethyl cellulose, guar gum, pullulan, rhamsan gum, welan gum, and succinoglycan with respect to the total amount of the ink.

Also, in the present invention, a writing instrument such as a ball-point pen and the like in which an erasable ink composition comprising the following components is contained in an ink containment portion can be used.

(a) a colored and/or non-colored flaky particle
(b) an adhesive resin
(c) a shear thinning viscosity imparting agent, and
(d) a solvent.

Also, in the present invention, a writing instrument such as a ball-point pen and the like in which an aqueous erasable ink composition containing the following components in the following amount with respect to the total amount of the ink and containing no colorant other than the following flaky particle is contained in an ink containment portion can be used.

| | |
|---|---|
| (a) a colored and/or non-colored flaky particle (whose average particle diameter is within the range of 2 to 10 μm) | 0.5 to 50% by weight |
| (b) an adhesive resin (whose average particle diameter is not greater than 10 μm and minimum film forming temperature (MFT) is not greater than 40° C. or glass-transition temperature (Tg) is not greater than 40° C.) | 1 to 30% by weight |
| (c) a shear thinning viscosity imparting agent selected at least one from xanthane gum, carboxyl methyl cellulose, guar gum, pullulan, rhamsan gum, welan gum, and succinoglycan | 0.01 to 20% by weight |
| (d) a water-soluble organic solvent | 1 to 40% by weight, and |
| (e) water | remnant |

Also, in the present invention, a writing instrument in which an aqueous erasable ink composition comprising the following components is contained in an ink containment portion can be used.

(a) a melamine resin/silica compound spherical resin sphere colored by dyes having an anionic property and an average particle diameter of said resin sphere is 2 to 10 μm and the content of said particle diameter of not greater than 2 μm is not greater than 30% by weight with respect to said resin sphere (b) a colorless resin particle whose average particle diameter is 0.1 to 10 μm (c) an adhesive resin (d) a shear thinning viscosity imparting agent, and (e) a solvent (Preparation Method)

A preparation method of an ink composition of the present invention is not specifically limited and an ink can be prepared by conventionally known method of dispersion, defoaming, and filtering and the like and basically, it may be prepared in the same manner as in the preparation method of a known aqueous ink. However, for example, preparing in accordance with the following method is preferable. First, in the case of preparing an erasable ink composition comprising a colorant and a colorless resin particle, for example, water, water soluble organic solvent, and as required, other additives are mixed and stirred, followed by putting a colorless resin particle and a colorant and stirring, thereafter adding shear thinning viscosity imparting agent (water soluble resin) and a fixing resin (including an adhesive resin) and stirring. Next, pH is controlled as required in this mixed liquid and an aqueous ink composition as aimed is obtained.

In addition, when an erasable ink composition comprising a colored and/or non-colored flaky particle as said colorant is prepared, for example, the following method is preferable. That is, flaky particles (colorants) and adhesive resins (colorless resin particles as required) are dispersed in water and water soluble organic solvent, followed by putting a water soluble resin, regulating the pH as required, thereby obtaining an aqueous erasable ink composition. Regulation of particle size distribution of particles of colorants and the like is conducted by adding a dispersant as required, followed by diluting with water while stirring and conducting classification by centrifugal separation and the like using a dispersed liquid obtained thereby. Known devices such as mixers, kneaders and the like may be used for mixing and stirring. Known method may be employed for filtering, defoaming, and the like.

Further, for example, the same method is employed in preparing an aqueous erasable ink composition comprising melamine resin/silica compound spherical resin sphere colored by dyes having an anionic property as a colorant and conventionally known method of dispersing, defoaming, filtering, and the like can be employed for preparing an ink, and although basically, preparation is available as in the known method of an ink preparation, the following method is preferable. That is, an aqueous erasable ink was obtained by dispersing a colorant and an adhesive resin (if required, colorless resin particle) with water and a water soluble organic solvent, followed by putting a water soluble resin and as required, regulating pH. Regulation of particle size distribution of a colorant, an adhesive resin, and the like is conducted using dispersed liquid obtained by adding a dispersant as required, followed by diluting with water while stirring and may conduct classification by centrifugal separation and the like.

(Use Application)

The present invention is, in particular, preferably used for fields of writing instruments, for fields related to writing instruments, and the like.

It is useful in various use applications including erasable ink compositions for writing instruments (aqueous erasable ink compositions for ball-point pens, for marking pens, and the like), erasable ink compositions for coaters (aqueous erasable ink compositions for coating medium, and the like). In particular, it is most suitable for writing instruments, and among them, an aqueous erasable ink composition for ball-point pens.

The composition of the present invention can be applicable to substantially any kinds of writing instruments, printings, and the like. As writing instruments, it can be used for any of writing instruments whose pen tip is a ball or a fiber bundle, and whose ink containment portion is free containment tube or a central core type, for example, they are not limited to valve types or non-valve types and they can be used for any such as marking pens, felt-tip pens ball-point pens, and the like. In particular, due to its excellent erasability, it is most suitable for ball-point pens (so called aqueous ball-point pens).

In a ball-point pen of the present invention, known materials for ball-point pens may be employed except for using an erasable ink composition of the present invention as an ink. For example, known materials with known size can be applicable as they are for an ink containment tube. Regarding the materials of an ink containment tube, for example, pipes made of synthetic resins such as polyethylene, polypropylene, and the like, and as for others, pipes made of metal can be employed. Also, regarding the materials of a ball-point pent tip, same materials and same structure as used in the known aqueous ball-point pens can be employed.

Regarding the assembly of a ball-point pen, known method of assembly may be followed. For example, an erasable ink composition of the present invention is filled in an ink containment tube made of polypropylene in which a nickel silver ball-point pen tip (materials of a ball: sintered bard alloy, ceramics, and the like) is provided at one end, thereby preparing a ball-point pen refill, followed by attaching a ball-point pen refill to a body and attaching a tail plug, thereafter removing the air in a tube by applying a centrifugal separation to a ball-point pen refill, thereby obtaining a ball-point pen of the present invention.

EXAMPLES (Erasable Ink Composition Comprising Colorless Resin Particles)

Aqueous erasable ink compositions related to Examples 1 to 5 and Comparative Examples 1 to 4 were obtained by the above preparation method with a composition and the compounding amount (% by weight) as shown in Table 1. Regarding dispersion method, defoaming method, filtering method, and the like, a conventionally known method was employed. For information, a colorant with a specific trade name as a colorant (a coloring resin sphere) in Table 1 was put in a dispersion mill, thereby preparing a diluted dispersion liquid and this was stirred for 3 hours, and by using the obtained dispersed liquid, classification was conducted with a centrifugal separation, thereby using particles adjusted to a specific particle diameter or a specific range of a particle diameter.

TABLE 1

| | | (Content amount: wt %) | | | | | | | | |
|---|---|---|---|---|---|---|---|---|---|---|
| | | Example | | | | | Comparative Example | | | |
| | | 1 | 2 | 3 | 4 | 5 | 1 | 2 | 3 | 4 |
| Colorless resin particle | I | 7.5 | 5 | 2.5 | 5 | 7.5 | | | | |
| | II | | | 5 | | | | | | |
| | III | | 5 | | 5 | | | | | |
| Colorant | I | 20 | 20 | | | 20 | 20 | 20 | | |
| | II | | | 7 | 7 | | | | 7 | |
| | III | | | | | | | | | 3 |
| Shear thinning viscosity imparting agent | I | 0.2 | 0.15 | | | 0.18 | 0.25 | 0.23 | | |
| | II | | | | 0.4 | | | | | 0.55 |
| | III | | | 0.35 | | | | | 0.45 | |
| Water soluble organic solvent | I | 5 | 5 | 5 | 5 | 5 | 5 | 5 | 5 | 5 |
| | II | 10 | 10 | 10 | 10 | 10 | 10 | 10 | 10 | 10 |
| Fixing resin | | | | | | 10 | | 10 | | |
| Antiseptic mildew proofing agent | | 0.4 | 0.4 | 0.4 | 0.4 | 0.4 | 0.4 | 0.4 | 0.4 | 0.4 |
| Rust inhibitor | | 0.8 | 0.8 | 0.8 | 0.8 | 0.8 | 0.8 | 0.8 | 0.8 | 0.8 |

TABLE 1-continued

| | | (Content amount: wt %) | | | | | | | | |
|---|---|---|---|---|---|---|---|---|---|---|
| | | Example | | | | | Comparative Example | | | |
| | | 1 | 2 | 3 | 4 | 5 | 1 | 2 | 3 | 4 |
| Lubricant | | 0.1 | 0.1 | 0.1 | 0.1 | 0.1 | 0.1 | 0.1 | 0.1 | 0.1 |
| Water | | 56 | 53.55 | 68.8 | 66.35 | 46.02 | 63.45 | 53.47 | 76.25 | 80.15 |
| Total | | 100 | 100 | 100 | 100 | 100 | 100 | 100 | 100 | 100 |
| Color difference | ΔE*ab | 5 | 4.5 | 7.3 | 6.8 | 5.5 | 14 | 13.5 | 19.5 | .45 |
| Erasability | | ○ | ○ | ○ | ○ | ○ | X | X | X | X |

Next, aqueous erasable ink compositions related to Examples 6 to 8 and Comparative Example 5 were obtained by the same preparation method as in Table 1 with a composition and the compounding amount (% by weight) as shown in Table 2. Regarding dispersion method, defoaming method, filtering method, and the like, a conventionally known method was employed. For information, regarding a colorant (IV) in Table 2, a colorant with a specific trade name was put in a dispersion mill, thereby preparing a diluted dispersion liquid and this was stirred for 3 hours, and by using the obtained dispersed liquid, classification was conducted with a centrifugal separation, thereby using particles adjusted to a specific particle diameter or a specific range of a particle diameter.

TABLE 2

| | | (Content amount: wt %) | | | |
|---|---|---|---|---|---|
| | | Example | | | Comparative Example |
| | | 6 | 7 | 8 | 5 |
| Colorless resin particle | I | 2.5 | | | |
| | II | | 2.5 | | |
| | III | 2.5 | 2.5 | 5 | 5 |
| Colorant | IV | 10 | | | |
| | V | | 10 | 10 | |
| | VI | | | | 10 |
| Shear thinning viscosity imparting agent | I | 0.2 | 0.2 | 0.2 | 0.2 |
| Water soluble organic solvent | I | 5 | 5 | 5 | 5 |
| | II | 10 | 10 | 10 | 10 |
| Antiseptic mildew proofing agent | | 0.4 | 0.4 | 0.4 | 0.4 |
| Rust inhibitor | | 0.8 | 0.8 | 0.8 | 0.8 |
| Lubricant | | 0.1 | 0.1 | 0.1 | 0.1 |
| Water | | 68.5 | 68.5 | 68.5 | 68.5 |
| Total | | 100 | 100 | 100 | 100 |
| Erasability | | ◎ | ○ | ○ | Δ |

In Tables 1 and 2, a composition of each material is as follows.

(Colorless Resin Particle)

I Uncross-linking acryl powder: trade name "MP-1451" manufactured by Soken Chemical & Engineering Co., Ltd, average particle diameter about 0.15 μm II Uncross-linking acryl powder: trade name "MP-1600" manufactured by Soken Chemical & Engineering Co., Ltd, average particle diameter about 0.8 μm III Cross-linking acryl powder: trade name "MX-300" manufactured by Soken Chemical & Engineering Co., Ltd, average particle diameter about 3 μm (Colorant)

I Black colored acryl coloring particle: black colored azo-based dye containing gold coloring acryl resin sphere classified product of 4 μm manufactured by Soken Chemical & Engineering Co., Ltd II Black colored toner for copies: classified product of 2.5 to 7.0 μm of trade name "MBX-5" manufactured by SEKISUI CHEMICAL CO., LTD, average particle diameter about 5.9 μm III Black colored pigment: trade name "Carbon black #30" (C.I.77266) manufactured by MITSUBISHI CHEMICAL CORPORATION, average particle diameter about 0.03 μm IV Black colored flaky particle: trade name "Oxide alumina carbon black colored flaky particle, average particle diameter 5 μm" manufactured by YKK Corporation (classified product in which particle diameter of less than 2 μm is cut by centrifugal separation)

V Black colored flaky particle: trade name "Oxide alumina carbon black colored flaky particle, average particle diameter 10 μm" manufactured by YKK Corporation VI Black colored flaky particle: trade name "Oxide alumina carbon black colored flaky particle, average particle diameter 2 μm" manufactured by YKK Corporation (Shear Thinning Viscosity Imparting Agent)

I Welan gum: trade name "K1C376" manufactured by CP Kelco ApS

II Xanthane gum: trade name "KELZAN" manufactured by CP Kelco ApS

III Succinoglycan: trade name "RHEOZAN" manufactured by CP Kelco ApS (Water Soluble Organic Solvent)

I Glycerine: reagent

II Propylene glycol: reagent (Fixing Resin)

SBR emulsion: trade name "0561" manufactured by JSR Co., Ltd, solid content 69%

(Antiseptic Mildew-Proofing Agent)

I 2-Benzoisothiazolin-3-on: trade name "Proxel XL-2" manufactured by Hoechst synthesis Co., Ltd.

(Rust Inhibitor)

Benzotriazole: reagent (Lubricant)

I Mono (or di) polyoxyethylene alkyl ether phosphoric acid: trade name "Phosphanol PE-510" manufactured by Toho Chemical Industry Co, Ltd.

(Preparation of a Test Sample)

Each of ink compositions of Examples 1 to 6 and Comparative Examples 1 to 4 was coated on white drawing paper using 20 μm of an ink with an applicator and was dried. A portion of a coated film after drying was erased using a commercially available eraser with a load of 1.5 kg by moving the eraser back and forth twice, thereby preparing a test sample. For information, the same was applied to Examples 6 to 8 and Comparative Example 5, in particular, the test samples of these were prepared with a load of 1.5 kg by moving the eraser back and forth five times.

(Evaluation Test)

Next, using the above mentioned test samples, the following test was conducted. These evaluation results were shown in Table 1.

(Color Difference)

Using the color and color difference meter CR 300 manufactured by MINOLTA Co., Ltd., color difference ⊿E*ab between erased portions of test samples related to Examples 1 to 6 and Comparative Examples 1 to 4 and the white drawing paper was measured.

(Erasability)

Erasability of test samples related to Examples 1 to 5 and Comparative Examples 1 to 4 was evaluated based on the following evaluation criteria.

○: color difference ⊿E*ab is less than 10 and has good erasability.

×: color difference ⊿E*ab exceeds 10 and does not have good erasability.

(Sensory Evaluation)

Regarding erasability of test samples related to Examples 6 to 8 and Comparative Example 5, a state in which a coated film (a written mark) was actually erased was observed and was evaluated under the following criteria.

Evaluation Criteria

⊚: for erasable very easily

○: for erasable easily

Δ: coloring becomes lighter

×: for almost no change

From Table 1, in an aqueous erasable ink composition related to Examples 1 to 5 which comprise colorless resin particles, a coated film was completely removed by an eraser and showed excellent erasability.

In addition, coloring effect and fixability was also good. On the other hand, in Comparative Examples 1 to 4, a coated film cannot be completely removed and coloring component remained on an erasing portion, which showed unsatisfactory erasability.

From Table 2, in Examples 6 to 8 which comprise colorless resin particles and colored flaky particles, excellent erasability was recognized in all, however, in particular, exceptionally excellent erasability was shown in an ink of Example 6 comprising said flaky particles of classified products with an average particle diameter of 2 to 10 μm excluding particle diameter of less than 2 μm and colorless resin sphere. In the case of an aqueous ink composition comprising colored flaky particles, while an ink composition of Example 8 comprising said flaky particles having an average diameter larger than that of colorless resin spheres showed good erasability, an ink composition of Comparative Example 5 which has a reverse state showed lower erasability.

Since the ink of the present embodiment is an erasable ink composition comprising at least a colorant and a colorless resin particle, compared with an ink which does not comprise said colorless resin particles, eraser erasability is enhanced.

(Erasable Ink Composition Comprising Adhesive Resin)

An aqueous erasable ink of each Example was obtained by dispersing a colorant, an adhesive resin, and as required, a colorless resin particle with a compounding composition as shown in Table 3 with water and water soluble organic solvent, followed by putting a water soluble resin, an antiseptic mildew proofing agent, and a lubricant and regulating pH. For comparison, inks of Comparative Examples which do not comprise an adhesive resin and a colorless resin particle were prepared by the same method. Regarding dispersing and defoaming method, and filtering method, known methods were employed in preparing an ink. For information, a colorant was put in a dispersing mill to make diluted dispersion liquid, which was stirred for three hours and obtained dispersion liquid was classified by a centrifugal separation. The same was applied to an adhesive resin.

TABLE 3

| | | \multicolumn{14}{c|}{(Content amount: wt %)} |
|---|---|---|---|---|---|---|---|---|---|---|---|---|---|---|---|
| | | \multicolumn{8}{c|}{Example} | \multicolumn{6}{c|}{Comparative Example} |
| Composition | | 9 | 10 | 11 | 12 | 13 | 14 | 15 | 16 | 6 | 7 | 8 | 9 | 10 | 11 |
| Colorant | I | 20.00 | 20.00 | 20.00 | 20.00 | 20.00 | 20.00 | 20.00 | 20.00 | 20.00 | 20.00 | 20.00 | 20.00 | 20.00 | 20.00 |
| Colorless resin sphere | I | | | | 7.50 | 7.50 | | | | | | 7.50 | | | |
| Adhesive ratio | I | 10.00 | 10.00 | 10.00 | 10.00 | 10.00 | 10.00 | | | 20.00 | 20.00 | | 10.00 | | |
| | II | | | | | | | 10.00 | 10.00 | | | | 20.00 | | |
| | III | 2.90 | | | | | | | | | | | | | |
| | IV | | 2.57 | 6.00 | 2.57 | 6.00 | | | | | | | | 1.06 | 10.00 |
| | V | | | | | | 4.00 | | | | | | | | |
| | VI | | | | | | | 5.00 | | | | | | | |
| | VII | | | | | | | | 4.09 | | | | | | |
| Water soluble organic solvent | I | 15.00 | 15.00 | 15.00 | 15.00 | 15.00 | 15.00 | 15.00 | 15.00 | 15.00 | 15.00 | 15.00 | 15.00 | 15.00 | 15.00 |
| Water soluble | I | 0.21 | 0.22 | 0.20 | 0.18 | 0.16 | 0.21 | 0.20 | 0.20 | 0.26 | 0.20 | 0.23 | 0.23 | 0.23 | 0.23 |

TABLE 3-continued (Content amount: wt %)

| | Example | | | | | | | | Comparative Example | | | | | |
|---|---|---|---|---|---|---|---|---|---|---|---|---|---|---|
| Composition | 9 | 10 | 11 | 12 | 13 | 14 | 15 | 16 | 6 | 7 | 8 | 9 | 10 | 11 |
| resin | | | | | | | | | | | | | | |
| Antiseptic I agent | 0.30 | 0.30 | 0.30 | 0.30 | 0.30 | 0.30 | 0.30 | 0.30 | 0.30 | 0.30 | 0.30 | 0.30 | 0.30 | 0.30 |
| Lubricant I | 0.25 | 0.25 | 0.25 | 0.25 | 0.25 | 0.25 | 0.25 | 0.25 | 0.25 | 0.25 | 0.25 | 0.25 | 0.25 | 0.25 |
| Water | 51.34 | 51.66 | 48.25 | 44.20 | 40.79 | 50.24 | 49.25 | 50.16 | 64.19 | 44.25 | 36.72 | 44.22 | 53.16 | 54.22 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |
| Distribution ratio (wt %) of particles of adhesive resin of not greater than 2μ | 40 | 30 | 50 | 30 | 50 | 40 | 40 | 40 | 0 | 0 | 0 | 0 | 15 | 100 |
| Evaluation of fixability | ○ | ○ | ○ | ○ | ○ | ○ | ○ | ○ | × | Δ | Δ | Δ | Δ | ○ |
| Evaluation of erasability | ○ | ○ | ○ | ○ | ○ | ○ | ○ | ○ | ○ | × | Δ | × | ○ | × |

In Table 3, each component in a composition is as follows.

(Colorant)

I Red colored resin sphere: acrylic resin, red colored azo-based dye containing gold, classified product of 6 μm manufactured by Soken Chemical & Engineering Co., Ltd (Colorless Resin Sphere)

I Acrylic (uncross-linking) type, trade name "MX-300", average particle diameter of 3 μm manufactured by Soken Chemical & Engineering Co., Ltd (Adhesive Resin)

I Acrylic resin: trade name "Nikasol B7611", average particle diameter of 5.4 μm, solid content 30% manufactured by NIPPON CARBIDE INDUSTRIES CO., INC II Acrylic resin: trade name "Nikasol B7612", average particle diameter of 5.4 μm, solid content 30% manufactured by NIPPON CARBIDE INDUSTRIES CO., INC III SBR emulsion: trade name "JSR 0561", average particle diameter of 0.7 μm, solid content 69% manufactured by JSR Co., Ltd IV SBR emulsion: trade name "JSR 0589", average particle diameter of 0.22 μm, solid content 50% manufactured by JSR Co., Ltd V SBS emulsion: trade name "H-3175A", average particle diameter of 1.6 μm, solid content 50% manufactured by DAIICHI KOGYO SEIYAKU CO., LTD VI Acrylic resin: trade name "SL-22", average particle diameter of 0.2 μm, solid content 40% manufactured by NIHON JUNYAKU CO., LTD VII Vinyl acetate resin: trade name "TG-314A", average particle diameter of 0.13 μm, solid content 49% manufactured by NIPPON CARBIDE INDUSTRIES CO., INC (Water Soluble Resin)

I Welan gum: trade name "K1C 376" manufactured by SANSHO CO., LTD (Water Soluble Organic Solvent)

I Glycerine: reagent (Antiseptic Mildew Proofing Agent)

1,2-Benzoisothiazolin-3-on: trade name "Proxel GXL" manufactured by Hoechst synthesis Co., Ltd.

(Lubricant)

I POE alkyl ether phosphoric acid ester: trade name "Phosphanol ML-220" manufactured by Toho Chemical Industry Co., Ltd.

(Evaluation Method)

Next, in order to evaluate fixability of a written mark and erasability, the following tests were conducted. The result is shown in Table 3.

(Evaluation on Fixability)

20 μm of an obtained aqueous erasable ink was coated on a white drawing paper and was used as a test coated film after it was left to dry. An obtained test coated film was rubbed once with 1 kg of a weight wound with a dried cotton broad cloth and a state of a test coated film was studied and was evaluated by the following criteria.

Evaluation Criteria

○: No change

Δ: Partially peeled off

×: Almost peeled off (Evaluation of Erasability)

20 μm of an obtained aqueous erasable ink was coated on a white drawing paper and was used as a test coated film after it was left to dry. 1.5 kg of a load was applied to an obtained test coated film with a commercially available plastic eraser with a movement of going back and forth five times and erasability was studied by visual observation and was evaluated by the following criteria.

Evaluation Criteria

○: Easily erasable

Δ: Getting thin

×: Almost no change

From Table 3, compared with an ink of Comparative Example 6, it was recognized that every ink of all Examples can be easily erased with a commercially available eraser and at the same time, every ink of all Examples showed excellent fixability with no peeling off of a written mark and a coated film even with a rubbing force of 1 kg. On the other hand, in Comparative Examples 7 and 9 in which an average particle diameter of said adhesive resin exceeds 2 μm and no adhesive resin whose particle diameter is not greater than 2

μm is comprised, although fixability was improved compared with Comparative Example 6 in some extent due to an adhesive resin with an average diameter of exceeding 2 μm, erasability lowered. In addition, in Comparative Example 10 in which an adhesive resin particle whose average particle diameter exceeds 2 μm but the content is less than 30% by weight in an adhesive resin, erasability was good but fixability lowered.

On the other hand, inks in Examples showed excellent erasability and fixability in which an average particle diameter of said colorant is not greater than 2 μm, and the content of said adhesive resin whose particle diameter is not greater than 2 μm is not less than 30% by weight in an adhesive resin, in particular, 30 to 50% by weight.

Since the embodiment of the present invention is, as mentioned above, an erasable ink composition comprising a colorant whose average particle diameter is not less than 2 μm and an adhesive resin in which the content of an adhesive resin whose particle diameter is not greater than 2 μm is not less than 30% by weight, even a line written on paper or the like with high pen pressure, it can be easily erased by an eraser and at the same time, fixability greatly improves.

(Erasable ink composition comprising flaky particles)

Aqueous erasable ink compositions were obtained with a compound composition as shown in Tables 4 and 5 by dispersing flaky particles, adhesive resins, colorless resin particles as required with water and a water soluble organic solvent, followed by putting a shear thinning viscosity imparting agent, an antiseptic mildew proofing agent, a rust inhibitor, and a lubricant and regulating pH. For comparison, inks of Comparative Examples which do not comprise an adhesive resin and a colorless resin particle were prepared by the same method. Regarding dispersing and defoaming method, and filtering method, known methods were employed in preparing an ink.

TABLE 4

| | | (Content amount: wt %) Example | | | | |
|---|---|---|---|---|---|---|
| | | 17 | 18 | 19 | 20 | 21 |
| Flaky particle | I | 10.00 | 10.00 | 10.00 | | |
| (Colorant) | II | | | | 10.00 | 10.00 |
| Colorless resin particle | I | | 3.00 | | | |
| Adhesive resin | I | 4.00 | 4.00 | | | |
| | II | | | 20.00 | | |
| | III | | | | 15.00 | |
| | IV | | | | | 5.00 |
| | V | | | | | |
| | VI | | | | | |
| Shear thinning agent | I | 0.25 | 0.20 | 0.25 | 0.23 | 0.24 |
| Water soluble | I | 5.00 | 5.00 | 5.00 | 5.00 | 5.00 |
| organic solvent | II | 10.00 | 10.00 | 10.00 | 10.00 | 10.00 |
| Antiseptic mildew proofing agent | I | 0.40 | 0.40 | 0.40 | 0.40 | 0.40 |
| Rust inhibitor | I | 0.80 | 0.80 | 0.80 | 0.80 | 0.80 |
| Lubricant | I | 0.25 | 0.25 | 0.25 | 0.25 | 0.25 |
| Water | | 69.30 | 66.35 | 53.30 | 58.32 | 68.31 |
| Total | | 100.00 | 100.00 | 100.00 | 100.00 | 100.00 |
| Fixability | | ○ | ○ | ○ | ○ | ○ |
| Erasability | | ○ | ○ | ○ | ○ | ○ |

TABLE 5

| | | (Content amount: wt %) Comparative Example | | | | | |
|---|---|---|---|---|---|---|---|
| | | 12 | 13 | 14 | 15 | 16 | 17 |
| Flaky particle | I | 10.00 | 10.00 | 10.00 | 10.00 | | |
| (Colorant) | II | | | | | 10.00 | 10.00 |
| Colorless resin particle | I | | | | | | |
| Adhesive resin | I | | | | | | |
| | II | | | | | | |
| | III | | | | | | |
| | IV | | | | | | |
| | V | 4.00 | 4.00 | | 4.00 | | |
| | VI | | | 20.00 | | 20.00 | 20.00 |
| Shear thinning agent | I | 0.25 | 0.25 | 0.20 | 0.25 | 0.18 | 0.13 |
| Water soluble organic solvent | I | 5.00 | 5.00 | 5.00 | 5.00 | 5.00 | 5.00 |
| | II | 10.00 | 10.00 | 10.00 | 10.00 | 10.00 | 10.00 |
| Antiseptic agent | I | 0.40 | 0.40 | 0.40 | 0.40 | 0.40 | 0.40 |
| Rust inhibitor | I | 0.80 | 0.80 | 0.80 | 0.80 | 0.80 | 0.80 |
| Lubricant | I | 0.25 | 0.25 | 0.25 | 0.25 | 0.25 | 0.25 |
| Water | | 73.30 | 69.30 | 53.35 | 69.30 | 53.37 | 33.42 |
| Total | | 100.00 | 100.00 | 100.00 | 100.00 | 100.00 | 100.00 |
| Fixability | | X | X | X | X | X | X |
| Erasability | | ○ | ○ | ○ | ○ | ○ | ○ |

(Note) In Tables 4 and 5, the materials shown by the following reference numbers.

(Flaky Resin Particle)

I Black colored flaky particle: trade name "Oxide alumina carbon black colored flaky particle, average particle diameter 5 μm" manufactured by YKK Corporation (classified product in which particle diameter of less than 2.0 μm is cut by centrifugal separation)

II Black colored flaky particle: trade name "Oxide alumina carbon black colored flaky particle, average particle diameter 10 μm" manufactured by YKK Corporation (Colorless Resin Sphere)

I Acrylic type (cross-linking): trade name "MX-300" manufactured by Soken Chemical & Engineering Co., Ltd, average particle diameter 3.00 μm (Adhesive Resin)

I Acrylic resin: trade name "JULIMER AT-210", solid content about 30%, Tg—7.5° C. manufactured by NIHON JUNYAKU CO., LTD II Acrylic resin: trade name "SL-22", average particle diameter of 0.2 μm, solid content about 40%, Tg 40° C. manufactured by NIHON JUNYAKU CO., LTD III Acrylic resin: trade name "Nikasol B7612", average particle diameter of 5.4 μm, solid content about 30%, Tg—49° C., manufactured by NIPPON CARBIDE INDUSTRIES CO., INC IV SBR emulsion: trade name "JSR0589" manufactured by JSR Co., Ltd, average particle diameter of 0.2 μm, solid content about 50%, Tg 0° C. manufactured by NIPPON CARBIDE INDUSTRIES CO., INC V Acrylic resin: trade name "JULIMER AT-613", solid content about 30%, Tg 76° C. manufactured by NIHON JUNYAKU CO., LTD VI Acrylic resin emulsion: trade name "Nikasol RX-306E", average particle diameter of 0.2 μm, solid content about 40%, Tg 70° C. manufactured by NIPPON CARBIDE INDUSTRIES CO., INC (Shear Thinning Viscosity Imparting Agent/Water Soluble Thickening Resin)

I Welan gum: trade name "K1C 376" manufactured by SANSHO CO., LTD (Water Soluble Organic Solvent)

I Glycerine: reagent

II Propylene glycol: reagent (Antiseptic Mildew Proofing Agent)

I 1,2-Benzoisothiazolin-3-on: trade name "Proxel GXL-2" manufactured by Hoechst synthesis Co., Ltd.

(Rust inhibitor)

Benzotriazole: reagent (Lubricant)

I POE alkyl ether phosphoric acid ester: trade name "Phosphanol PE-510" manufactured by Toho Chemical Industry Co, Ltd., phosphoric acid ester active agent (Evaluation Method)

First, a ball-point pen was set up using each ink composition. Each ball-point pen was obtained by filling each ink composition in an ink containment tube composed of a semi-transparent polypropylene hollow cylinder tube in which a ball-point pen tip made of a stainless steel (ball: silicon carbide) is provided at an end. Next, the following test was conducted in order to evaluate fixability of a written mark and erasability. The results are shown in Tables 4 and 5.

(Erasability)

Using said ball-point pen lines were drawn on a white drawing paper and in 10 minutes, said lines were rubbed with a commercially available eraser with normal pressure and the degree of erasability of lines was observed by naked eyes. The evaluation was conducted by the following evaluation criteria.

Evaluation Criteria

○: for erasable easily

Δ: coloring becomes lighter

×: for almost no change (Evaluation of Fixability)

Using said ball-point pen, lines were drawn on a white drawing paper and in 10 minutes, this obtained test coated film was rubbed once with 1 kg of a weight wound with a dried cotton broad cloth and a state of a test coated film was studied and was evaluated by the following criteria.

Evaluation Criteria

○: No change

Δ: Partially peeled off

×: Almost peeled off

From Tables 4 and 5, compared with an ink of Comparative Example 12 which comprises no adhesive resin, every ink of all the Examples can be easily erased by a commercially available eraser and at the same time, written mark and coated film are not peeled off even with rubbing force of 1 kg and therefore, it was recognized that excellent fixability was shown.

Since even lines with high pressure of a ball-point pen can be easily erased and fixability of written mark and coated film is excellent, the ink is also preferable for ballpoint pens. On the other hand, even in the case of an ink which comprises said adhesive resin, when its minimum film forming temperature (MFT) is not greater than 40° C. or when its glass-transition temperature (Tg) is not greater than 40° C. as shown in Comparative Examples 13 to 17, every test coated film was peeled off and left a problem of fixability.

As mentioned above, since the ink of the present embodiment is an erasable ink composition comprising a colored and/or non-colored flaky particles and an adhesive resin whose minimum film forming temperature (MFT) is not greater than 40° C., or whose glass-transition temperature (Tg) is not greater than 40° C., a written mark can be easily erased by an eraser and at the same time, excellent fixability can be shown.

(An Erasable Ink Composition Using Melamine Resin/Silica Compound Spherical Resin Sphere Colored by a Dye Having Anionic Property as a Colorant)

An aqueous erasable ink was obtained by dispersing a colorant, an adhesive resin, and as required, a colorless resin particle with a compounding composition as shown in Table 6 with water and water soluble organic solvent, followed by putting a shear thinning viscosity imparting agent (water soluble resin), an antiseptic mildew proofing agent, and lubricant and regulating pH. For comparison, inks which do not comprise an adhesive resin and a colorless resin particle were prepared by the same method. Regarding dispersing and defoaming method, and filtering method, known methods were employed in preparing an ink. For information, a colorant was put in a dispersing machine to make diluted dispersion liquid, which was stirred for three hours and obtained dispersion liquid was classified by a centrifugal separation. The same was applied to an adhesive resin.

TABLE 6

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Colored resin sphere | I | 15.00 | | | | | | | | | | | |
| | II | | 15.00 | | 15.00 | | 15.00 | | 15.00 | 15.00 | 15.00 | | |
| | III | | | 15.00 | | 15.00 | | 15.00 | | | | 15.00 | 15.00 |
| | IV | | | | | | | | | | | | |
| | V | | | | | | | | | | | | |
| | VI | | | | | | | | | | | | |
| Colorless resin sphere | I | | | | 7.50 | 7.50 | | | 7.50 | 7.50 | 7.50 | 7.50 | 7.50 |
| Adhesive agent | I | | | | | | 7.00 | 7.00 | 10.00 | 10.00 | 10.00 | 10.00 | 10.00 |
| | II | | | | | | 2.50 | | 3.30 | | | | |
| | III | | | | | | | 3.50 | | 5.00 | | | |
| | IV | | | | | | | | | | 2.60 | | |
| | V | | | | | | | | | | | 6.00 | |
| | VI | | | | | | | | | | | | 2.60 |
| | VII | | | | | | | | | | | | |
| Water soluble resin | I | 0.25 | 0.25 | 0.25 | 0.20 | 0.20 | 0.15 | 0.14 | 0.15 | 0.14 | 0.15 | 0.13 | 0.15 |
| Water soluble organic resin | I | 15.00 | 15.00 | 15.00 | 15.00 | 15.00 | 15.00 | 15.00 | 15.00 | 15.00 | 15.00 | 15.00 | 15.00 |
| Antiseptic agent | I | 0.40 | 0.40 | 0.40 | 0.40 | 0.40 | 0.40 | 0.40 | 0.40 | 0.40 | 0.40 | 0.40 | 0.40 |
| Rust inhibitor | I | 0.80 | 0.80 | 0.80 | 0.80 | 0.80 | 0.80 | 0.80 | 0.80 | 0.80 | 0.80 | 0.80 | 0.80 |
| Lubricant | I | 0.10 | 0.10 | 0.10 | 0.10 | 0.10 | 0.10 | 0.10 | 0.10 | 0.10 | 0.10 | 0.10 | 0.10 |
| Dispersant | I | 0.00 | 0.00 | 0.00 | 0.00 | 0.00 | 0.00 | 0.00 | 0.00 | 0.00 | 0.00 | 0.00 | 0.00 |
| Water | | 68.45 | 68.45 | 68.45 | 61.00 | 61.00 | 58.95 | 58.06 | 47.75 | 46.06 | 48.45 | 45.07 | 48.45 |
| Total | | 100.00 | 100.00 | 100.00 | 100.00 | 100.00 | 100.00 | 100.00 | 100.00 | 100.00 | 100.00 | 100.00 | 100.00 |
| Erasability ($\Delta E^*ab$) | | 1.5 | 3.2 | 3.7 | 2.1 | 2.5 | 3.5 | 4.1 | 2.2 | 2.5 | 2.6 | 3.1 | 2.8 |
| Fixability | | x | x | x | x | x | ○ | ○ | ○ | ○ | ○ | ○ | ○ |
| Distribution ratio (%) of particles of adhesive resin of not greater than 2 μm | | 0 | 0 | 0 | 0 | 0 | 30 | 40 | 30 | 40 | 30 | 50 | 30 |

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Colored resin sphere | I | | | | | | | | | | |
| | II | | | 15.00 | | | | | 15.00 | | |
| | III | | | | | | | | | | |
| | IV | 15.00 | 15.00 | | 15.00 | 15.00 | 15.00 | 15.00 | | | |
| | V | | | | | | | | | 4.00 | |
| | VI | | | | | | | | | | 15.00 |
| Colorless resin sphere | I | | 7.50 | | | 7.50 | 7.50 | | 7.50 | 2.50 | 7.50 |
| Adhesive agent | I | | | 7.00 | 7.00 | 10.00 | 10.00 | | 10.00 | 2.50 | 7.00 |
| | II | | | | | | 1.40 | | | 0.90 | 2.60 |
| | III | | | | | | | 10.00 | | | |
| | IV | | | | | | | | | | |
| | V | | | | | | | | | | |
| | VI | | | | | | | | | | |
| | VII | | | | | | | | 2.60 | | |
| Water soluble resin | I | 0.25 | 0.20 | 0.20 | 0.23 | 0.15 | 0.15 | 0.23 | 0.15 | 0.25 | 0.15 |
| Water soluble organic resin | I | 15.00 | 15.00 | 15.00 | 15.00 | 15.00 | 15.00 | 15.00 | 15.00 | 15.00 | 15.00 |
| Antiseptic agent | I | 0.40 | 0.40 | 0.40 | 0.40 | 0.40 | 0.40 | 0.40 | 0.40 | 0.40 | 0.40 |
| Rust inhibitor | I | 0.80 | 0.80 | 0.80 | 0.80 | 0.80 | 0.80 | 0.80 | 0.80 | 0.80 | 0.80 |
| Lubricant | I | 0.10 | 0.10 | 0.10 | 0.10 | 0.10 | 0.10 | 0.10 | 0.10 | 0.10 | 0.10 |
| Dispersant | I | 0.00 | 0.00 | 0.00 | 0.00 | 0.00 | 0.00 | 0.00 | 0.00 | 0.50 | 0.50 |
| Water | | 68.45 | 61.00 | 61.50 | 61.47 | 51.05 | 49.65 | 58.47 | 48.45 | 73.05 | 50.95 |
| Total | | 100.00 | 100.00 | 100.00 | 100.00 | 100.00 | 100.00 | 100.00 | 100.00 | 100.00 | 100.00 |
| Erasability ($\Delta E^*ab$) | | 9.2 | 7.8 | 2.7 | 10.8 | 8.6 | 9.5 | 35.6 | 2.5 | 55.0 | 1.8 |
| Fixability | | x | x | Δ | Δ | Δ | Δ | ○ | Δ | ○ | Δ |
| Distribution ratio (%) of particles of adhesive resin of not greater than 2 μm | | 0 | 0 | 0 | 0 | 0 | 15 | 100 | 30 | 30 | 30 |

In Table 6, each component in the composition is as follows.

Colored Resin Sphere

I "Acid Yellow 73 colored melamine resin/silica compound resin" average particle diameter 7.1 μm, manufactured by NISSAN CHENICAL, INDUSTRIES II "Acid Red 87 colored melamine resin/silica compound resin" average particle diameter 6.4 μm, manufactured by NISSAN CHENICAL INDUSTRIES III "Acid Blue 62 colored melamine resin/silica compound resin" average particle diameter 5.9 μm, manufactured by NISSAN CHENICAL INDUSTRIES IV "Solvent red 8 colored acrylic resin 6 μclassified product" manufactured by Soken Chemical & Engineering Co., Ltd V "Carbon black #30", average particle diameter 0.03 μm, manufactured by MITSUBISHI CHEMICAL CORPORATION III "Rubcouleur 020 carbon black colored acrylic resin" average particle diameter 20.2 μm, manufactured by Dainichiseika Color & Chemicals Mfg. Co., Ltd Non-Colored Resin Sphere I Acrylic type (cross-linking): trade name "MX-300" manufactured by Soken Chemical & Engineering Co., Ltd, average particle diameter 3.0 μm Adhesive Resin I Acrylic resin emulsion: trade name "Nikasol B7612", average particle diameter of 5.4 μm, solid content about 30% Tg—49° C. (manufactured by NIPPON CARBIDE INDUSTRIES CO., INC)

II Acrylic resin emulsion: trade name "RX-7013", particle diameter of 0.05 μm, solid content about 40%, Tg 40° C., (manufactured by NIPPON CARBIDE INDUSTRIES CO., INC)

III Acrylic resin emulsion: trade name "SL-22", particle diameter of 0.2 μm, solid content about 40%, Tg 40° C. manufactured by NIHON JUNYAKU CO., LTD.

IV SBR emulsion: trade name "JSR 0589", particle diameter 0.2 μm, solid content 50% manufactured by JSR Co., Ltd V SBS emulsion: trade name "H-3175", particle diameter 1-2 μm, solid content 50% manufactured by DAIICHI KOGYO SEIYAKU CO., LTD VI Vinyl acetate resin emulsion: trade name "TG-314A", particle diameter 0.15 μm, solid content 49% manufactured by NIPPON CARBIDE INDUSTRIES CO., INC VII Acrylic resin emulsion: trade name "Nikasol RX-3006E", particle diameter 0.2 μm, solid content about 40%, Tg 70° C. manufactured by NIPPON CARBIDE INDUSTRIES CO., INC Shear Thinning Viscosity Imparting Agent/Water Soluble Thickening Resin I Welan gum: trade name "K1C376" manufactured by SANSHO CO., LTD Water Soluble Organic Solvent I Glycerine: reagent Antiseptic Mildew-Proofing Agent I 1,2-Benzoisothiazolin-3-on: trade name "Proxel GXL" manufactured by Hoechst synthesis Co., Ltd.

Rust Inhibitor

I Benzotriazole: reagent

Lubricant

I POE alkyl ether phosphoric acid ester: trade name "Phosphanol ML-220" manufactured by Toho Chemical Industry Co, Ltd, phosphoric acid ester active agent lubricant Dispersant I Polyethylene glycol acryl phenyl ether reagent Evaluation Method Next, the following test was conducted in order to evaluate fixability of a written mark and erasability. The result was shown in Table 6.

(Evaluation on Fixability)

20 μm of an obtained aqueous erasable ink was coated on a white drawing paper using an applicator and was used as a test coated film after it was left to dry. An obtained test coated film was rubbed once with 1 kg of a weight wound with a dried cotton broad cloth and a state of a test coated film was studied and was evaluated by the following criteria.

Evaluation Criteria o: No change

Δ: Partially peeled off x: Almost peeled off (Evaluation of Erasability)

20 μm of an obtained aqueous erasable ink was coated on a white drawing paper using an applicator and was used as a test coated film after it was left to dry. An obtained coated film was erased using a commercially available eraser with a load of 1.5 kg by moving the eraser back and forth five times, thereby evaluating by color difference $\Delta E^*ab$ between remained color and white drawing paper. (When $\Delta E^*ab$ is not greater than 5, a test coated film is almost erased.)

From Table 6, compared with Examples, Comparative Examples 18, 19, 21, 22, 23, and 24 which do not used colored resin sphere of the present application showed high value of color difference $\Delta E^*ab$, from which bad erasability was observed. In addition, Comparative Example 25 is good in erasability but bad in fixability since adhesive resin of not greater than 2 μm is not compounded. Further, Comparative Example 25 is good in erasability but bad in fixability since adhesive resin of not greater than 2 μm is compounded but Tg is high. Further, Comparative Example 26 is bad in erasability since an average particle diameter of colored resin sphere is not greater than 2 μm and Comparative Example 27 is good in erasability since an average particle diameter of colored resin sphere is not less than 10 μm but bad in writing aptitude (double lines, condition of pen) and fixability.

As mentioned above, since the embodiment of the present invention is an aqueous erasable ink composition comprising melamine resin/silica compound resin sphere colored by a dye having an anionic property as a colorant and an average particle diameter of said resin sphere is 2 to 10 μm, and the content of particle diameter of not greater than 2 μm is not greater than 30% by weight, even when a colored resin particle is used as a colorant, there is no bleed of unreacted dyes and therefore it can be easily and completely erased by an eraser.

INDUSTRIAL APPLICABILITY

As mentioned above, since the present invention is an erasable ink composition capable of being easily erased by an eraser and showing excellent fixability even when written with high pressure. Therefore, it can be used for various applications such as erasable ink compositions for writing instruments (including erasable ink compositions for ball-point pens, for marking pens, and the like) and erasable ink compositions for applicators (including erasable ink compositions for coatings, and the like) and it can preferably be used for inks for writing instruments, printings, coatings, copiers, and the like.

What is claimed is:

1. An erasable ink composition comprising at least a colorant and a colorless resin particle, wherein
an ink viscosity is 100 to 10000 mPa·s measured by an ELD viscometer 3° by R14 cone, 0.5 rpm at the temperature of 20° C., and
a minimum film forming temperature (MFT) of the colorless resin particle is not lower than 40° C. and a glass-transition temperature (Tg) of the colorless resin particle is not lower than 40° C.

2. An erasable ink composition comprising at least a colorant and a colorless resin particle, wherein
said colorless resin particle has an average particle diameter which is smaller than that of said colorant, and
an ink viscosity is 100 to 10000 mPa·s measured by an ELD viscometer 3° by R14 cone, 0.5 rpm at the temperature of 20° C.

3. An erasable ink composition as set forth in claim 2, wherein specific gravity of said colorless resin particle is larger than that of said colorant.

4. An erasable ink composition as set forth in claim 2, wherein said colorless resin particle has an average particle diameter which is larger than that of said colorant and specific gravity of said colorless resin particle is larger than that of said colorant.

5. An erasable ink composition as set forth in claim 2, wherein the content of said colorless resin particle is more than that of said colorant.

6. An erasable ink composition as set forth in claim 1, further comprising a shear thinning viscosity imparting agent and a solvent.

7. An erasable ink composition as set forth in claim 2, wherein an average particle diameter of said colorless resin particle is within the range of 0.1 to 10 μm.

8. An erasable ink composition as set forth in claim 1, wherein an average particle diameter of said colorant is not less than 2 μm.

9. An erasable ink composition as set forth in claim 2, wherein a minimum film forming temperature (MFT) of the colorless resin particle is not lower than 40° C. and a glass-transition temperature (Tg) of the colorless resin particle is not lower than 40° C.

10. An erasable ink composition as set forth in claim 1, wherein said colorless resin particle is contained in 1 to 30% by weight with respect to the total amount of the ink.

11. An erasable ink composition as set forth in claim 1, wherein said colorant is contained in 1 to 40% by weight with respect to the total amount of the ink.

12. An erasable ink composition as set forth in claim 1, wherein colored and/or non-colored flaky particle is contained as said colorant.

13. An erasable ink composition as set forth in claim 12, wherein said flaky particle is contained as a colorant and an average particle diameter of a colorant which comprises said flaky particle is not less than 2 μm.

14. An erasable ink composition as set forth in claim 12, wherein said flaky particle is at least one species selected from the group consisting of flaky alumina particle and flaky boron nitride.

15. An erasable ink composition as set forth in claim 12, not comprising a colorant other than said flaky particle.

16. An erasable ink composition as set forth in claim 12, wherein an average particle diameter of said flaky particle is within the range of 2 to 10 μm.

17. An erasable ink composition as set forth in claim 16, wherein the content of said flaky particle whose particle diameter is not greater than 1.8 μm is 1.6% by weight with respect to said flaky particle.

18. An erasable ink composition as set forth in claim 12, wherein the content of said flaky particle is 0.5 to 50% by weight with respect to the total amount of the ink.

19. An erasable ink composition as set forth in claim 2, comprising a melamine resin/silica compound spherical resin sphere as said colorant colored by dyes having anionic property, wherein an average particle diameter of said resin sphere is 2 to 10 μm and the content of said resin sphere whose particle diameter is not greater than 2 μm is not greater than 30% by weight in said resin sphere.

20. An erasable ink composition, comprising a melamine resin/silica compound spherical resin sphere as a colorant colored by dyes having anionic property, wherein an average particle diameter of said resin sphere is 2 to 10 μm and the content of said resin sphere whose particle diameter is not greater than 2 μm is not greater than 30% by weight in said resin sphere.

21. An erasable ink composition as set forth in claim 2, further comprising an adhesive resin.

22. An erasable ink composition comprising an adhesive resin and a colorant, wherein a melamine resin/silica compound spherical resin sphere as said colorant is contained as a colorant which is colored by dyes having anionic property, wherein an average particle diameter of said resin sphere is 2 to 10 μm and the content of said resin sphere whose particle diameter is not greater than 2 μm is not greater than 30% by weight in said resin sphere.

23. An erasable ink composition as set forth in claim 2, wherein a minimum film forming temperature (MFT) of said colorless resin is not greater than 40° C. or a glass-transition temperature (Tg) of said colorless resin is not greater than 40° C.

24. An erasable ink composition as set forth in claim 2, wherein an average particle diameter of said adhesive resin is not greater than 10 μm.

25. An erasable ink composition as set forth in claim 2, wherein the content of said adhesive resin is 1 to 30% by weight with respect to the total amount of the ink composition.

26. An erasable ink composition as set forth in claim 2, wherein said adhesive resin is at least one species selected from the group consisting of acryl based synthetic resin emulsion, acryl-styrene based synthetic resin emulsion, epoxy based synthetic resin emulsion, urethane based synthetic resin emulsion, silicone based synthetic resin emulsion, acryl based synthetic resin, acryl-styrene based synthetic resin, urethane based synthetic resin, vinyl based synthetic resin, cellulose based synthetic resin, and polyethylene oxide resin.

27. An erasable ink composition as set forth in claim 6, comprising polysaccharide as said shear thinning viscosity imparting agent.

28. An erasable ink composition as set forth in claim 27, wherein said polysaccharide is at least one species selected from the group consisting of xanthane gum, carboxylmethyl cellulose, guar gum, pullulan, rhamsan gum, welan gum, and succinoglycan.

29. An erasable ink composition as set forth in claim 2, wherein said shear thinning viscosity imparting agent is at least one compound selected from the group consisting of metal soaps, sorbitol derivatives, alkyl glutamine acid amides, aliphatic acid amides, polyethylene oxide waxes, dextrin aliphatic acid esters, hydrogenated castor oils, 12-hydroxystearic acid, and polyether ester type surfactant based gelling agent.

30. An erasable ink composition as set forth in claim 27, wherein the content of said shear thinning viscosity imparting agent is 0.01 to 4% by weight with respect to the total amount of the ink composition.

31. An erasable ink composition for writing instruments, wherein the ink set forth in claim 1 is used for the purpose of writing instruments.

32. A writing instrument wherein an aqueous erasable ink composition comprising the following components is contained in an ink containment portion;
- (a) a colored and/or non-colored flaky particle whose average particle diameter is 2 to 10 µm, which do not include a colorant other than said flaky particle,
- (b) a colorless resin particle whose average particle diameter is 0.1 to 10 µm,
- (c) a shear thinning viscosity imparting agent, and
- (d) a solvent.

33. A writing instrument wherein an erasable ink composition comprising the following components in the following content with respect to the total amount of the ink composition and comprising no colorant other than said flaky particle is contained in an ink containment portion;
- (a) 0.5 to 50% by weight of colored and/or non-colored flaky particle whose average particle diameter is within the range of 2 to 10 µm,
- (b) 1 to 30% by weight of an adhesive resin in which an average particle diameter of the resin particle is not greater than 10 µm and the minimum film temperature (MFT) is not greater than 40° C. or glass-transition temperature (Tg) is not greater than 40° C.,
- (c) 0.01 to 20% by weight of a shear thinning viscosity imparting agent selected at least one from xanthane gum, carboxymethyl cellulose, guar gum, pullulan, rhamsan gum, welan gum, and succinoglycan,
- (d) 1 to 40% by weight of a water soluble organic solvent, and
- (e) remained portion of water.

34. A writing instrument wherein an aqueous erasable ink composition comprising the following components is contained in an ink containment portion;
- (a) melamine resin/silica compound spherical resin sphere colored by dyes having anionic property and in which an average particle diameter of said resin sphere is 2 to 10 µm, and the content of particle diameter of not greater than 2 µm is not greater than 30% by weight in said resin sphere,
- (b) a colorless resin particle whose average particle diameter is 0.1 to 10 µm,
- (c) an adhesive resin,
- (d) a shear thinning viscosity imparting agent, and
- (e) a solvent.

* * * * *